United States Patent
Carver et al.

(10) Patent No.: US 10,783,593 B2
(45) Date of Patent: Sep. 22, 2020

(54) WEARABLE SMART BADGE

(71) Applicant: ADP, LLC, Roseland, NJ (US)

(72) Inventors: Michael Carver, Atlanta, GA (US);
Ismail Yagci, New York, NY (US);
Austin Warr, Kuna, ID (US); Matthew Robinson, Alpharetta, GA (US);
Christopher Park, Jacksonville, FL (US); Augusto Varas, Jacksonville, FL (US)

(73) Assignee: ADP, LLC, Roseland, NJ (US)

( * ) Notice: Subject to any disclaimer, the term of this patent is extended or adjusted under 35 U.S.C. 154(b) by 0 days.

(21) Appl. No.: 16/184,339

(22) Filed: Nov. 8, 2018

(65) Prior Publication Data

US 2020/0151827 A1 May 14, 2020

(51) Int. Cl.
| | |
|---|---|
| *H04B 7/00* | (2006.01) |
| *G06Q 50/00* | (2012.01) |
| *H04W 4/21* | (2018.01) |
| *H04W 4/80* | (2018.01) |
| *G06F 1/16* | (2006.01) |

(52) U.S. Cl.
CPC ............ *G06Q 50/01* (2013.01); *G06F 1/163* (2013.01); *H04W 4/21* (2018.02); *H04W 4/80* (2018.02)

(58) Field of Classification Search
CPC .......... G06Q 50/01; H04W 4/21; H04W 4/80; G06F 1/163
See application file for complete search history.

(56) References Cited

U.S. PATENT DOCUMENTS

| | | | |
|---|---|---|---|
| 6,711,414 B1 | 3/2004 | Lightman et al. | |
| 2012/0306643 A1* | 12/2012 | Dugan | A61B 5/742 340/539.12 |
| 2013/0267171 A1* | 10/2013 | Sarkar | H04B 7/24 455/41.1 |
| 2014/0108084 A1* | 4/2014 | Bargetzi | H04L 63/105 705/7.19 |
| 2014/0273854 A1* | 9/2014 | Breckman | H04W 4/80 455/41.2 |
| 2014/0327545 A1* | 11/2014 | Bolling | G08B 21/245 340/573.1 |

(Continued)

OTHER PUBLICATIONS

Bruno, "Smart Badges: Ready-To-Wear Networking," Event Tech Brief, accessed Jun. 27, 2018, 5 pages. http://www.eventtechbrief.com/top-stories/smart-badges-ready-to-wear-networking.

(Continued)

*Primary Examiner* — MD K Talukder
(74) *Attorney, Agent, or Firm* — Yee & Associates, P.C.

(57) ABSTRACT

A computer-implemented method, system, and computer program product for communicating among participants in a conference at a location, the computer-implemented method comprising: configuring a number of badges, each badge having a processor connected to a memory, a storage, a Bluetooth communications device, and a badge display; and storing a number of programs in the storage; wherein a first program of the number of programs is configured to broadcast one or more keywords; wherein a second program of the number of programs is configured to detect particular keywords in a received broadcast; and wherein the number of badges are configured to be wearable and visible to others when worn.

21 Claims, 6 Drawing Sheets

(56) References Cited

U.S. PATENT DOCUMENTS

| | | | | |
|---|---|---|---|---|
| 2014/0333412 A1* | 11/2014 | Lewis | ................... | H04W 12/06 |
| | | | | 340/5.2 |
| 2014/0341588 A1* | 11/2014 | Pederson | ................. | F21K 9/20 |
| | | | | 398/128 |
| 2015/0171926 A1* | 6/2015 | Coelho | ................ | H04B 5/0025 |
| | | | | 455/41.2 |
| 2015/0371027 A1* | 12/2015 | Kitajima | ................. | G06F 21/35 |
| | | | | 711/103 |
| 2016/0006857 A1* | 1/2016 | Di Giovanni | ............. | G06F 3/14 |
| | | | | 455/412.2 |
| 2016/0182170 A1* | 6/2016 | Daoura | ................... | H04W 4/02 |
| | | | | 455/3.01 |
| 2016/0226278 A1* | 8/2016 | Wenger | ................. | H02J 7/0044 |
| 2018/0108282 A1* | 4/2018 | Mullett | ................... | G09F 13/18 |
| 2018/0241489 A1* | 8/2018 | Daoura | ............. | G08B 21/0269 |
| 2018/0260591 A1* | 9/2018 | Nakano | ................... | G08B 7/06 |

OTHER PUBLICATIONS

Cox et al., "IntelliBadgeTM," Proc. of 1st International Workshop on Ubiquitous Systems for Supporting Social Interaction and Face-to-Face Communication in Public Spaces, 5th Annual Conference on Ubiquitous Computing, Oct. 2003, pp. 41-47.

* cited by examiner

WEARABLE SMART BADGE

BACKGROUND INFORMATION

1. Field

The present disclosure relates generally to an improved computer system for communicating among participants in a conference and, in particular, for communicating by a badge worn by the participants that broadcasts and receives information.

2. Background

Industry conferences place hundreds of participants in close proximity to each other during dates of attendance. Yet two attendees, each of whom may be working to solve similar problems and would welcome a chance to discuss their work with another professional, may never know of their common interests. Contact between the two attendees could result in a faster solution to the problem and to the elimination of redundant effort. Productivity gains would result if such meetings could be made commonplace, and not left to chance encounters.

Moreover, chances to meet others occur at conferences; however, meeting someone with common interests is random. Lists of attendees may be provided. Sometimes phone numbers and email addresses are furnished on attendee lists. Some indication of interest might be provided on such a list. However, privacy concerns may limit the use of lists. The lists must be prepared in advance and may be out-of-date at the time of issuance even with electronic distribution. Indeed, some individuals on such a list may not even be at the conference due to work changes or other reasons.

Attendees at a conference are issued wearable badges displaying at least the wearer's name and company. Additional information may be displayed on such badges, but too much information would not be readable by others as the wearer moved around. Moreover, the badges may not be worn straight, or they may be taken off for a time by an attendee. It would be desirable to improve communication using the badges at a conference so that reading the badge would not be the only way to obtain information about the wearer. A need exists for a way to assist participants to identify others with like interests or who work on solving similar problems. Indeed, in large companies, a need exists for a way for employees to identify other employees involved in the same product lines.

Therefore, it would be desirable to have a method and apparatus that take into account at least some of the issues discussed above, as well as other possible issues. For example, it would be desirable to have a method and apparatus that would provide for communicating among participants in a conference.

SUMMARY

An embodiment of the present disclosure provides a computer-implemented method for communicating among participants in a conference at a location, the computer-implemented method comprising: configuring a number of badges, each badge having a processor connected to a memory, a storage, a Bluetooth communications device, and a badge display; and storing a number of programs in the storage; wherein a first program of the number of programs is configured to broadcast one or more keywords; wherein a second program of the number of programs is configured to detect particular keywords in a received broadcast; and wherein the number of badges are configured to be wearable and visible to others when worn.

The illustrative embodiments also contemplate a computer configured to execute program code which implements this method. The illustrative embodiments also contemplate a non-transitory computer-recordable storage medium storing program code, which, when executed, implements this method.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
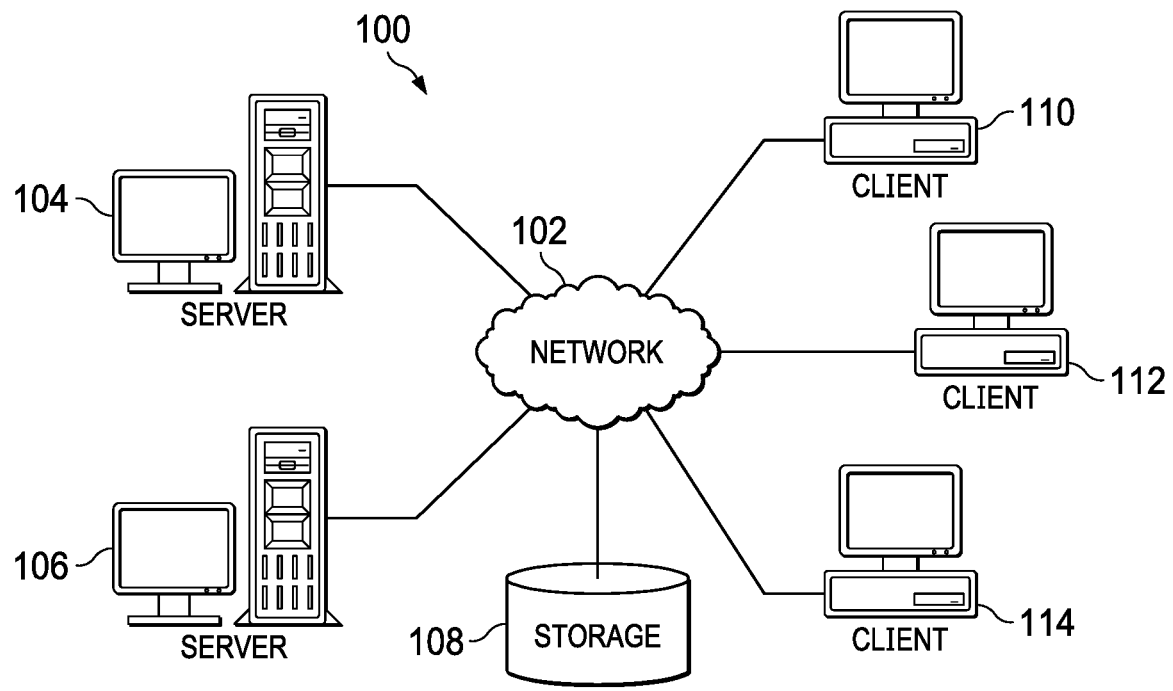
FIG. 1 is a block diagram of a data processing environment in accordance with an illustrative embodiment.

The illustrative embodiments recognize and take into account that making new connections may be challenging in conference environments, such as, for example, in a setting such as MoTM (Meeting of the Minds) where a large number of attendees are present from different companies.

The illustrative embodiments recognize and take into account that a smart badge may store detailed profile information about a user. The smart badge may communicate with other smart badges over Bluetooth®. A smart badge may analyze profile information received from other smart badges and determine if a like interest is found between two users.

The illustrative embodiments recognize and take into account that a smart badge may receive a broadcast from another smart badge, determine a common interest, and update a badge display to show a user's name from the other smart badge. The smart badge may display an indicator such as an LED to update each badge to a same color. The illustrative embodiments recognize and take into account that a broadcast from a smart badge may send information residing in a storage or memory of the smart badge for interception by another smart badge, and that the information may comprise keywords, a resume, a name of a badge wearer, and a statement of common interest. The illustrative embodiments recognize and take into account that a smart badge may be configured to hold and broadcast a number of different types of information in order to support a conference or meeting attended by wearers of the smart badges and to enhance experiences of the badge wearers while at the conference or meeting.

The illustrative embodiments recognize and take into account that a smart badge may have a screen that can display one or more of a name of a wearer, a name of another attendee having a smart badge, and a statement of common interest. The illustrative embodiments recognize and take into account that smart badge visual displays or visual cues may allow the wearers to identify each other and help start a conversation and create a possible new contact and professional relationship.

The illustrative embodiments recognize and take into account that GPS tracking may be incorporated into a smart badge. GPS tracking in a smart badge may be used in a conference setting so that a conference holder may determine what is most and least valuable to participants.

The illustrative embodiments recognize and take into account that smart badges may be used to transfer contact information from one smart badge to another. Moreover, the smart badge may be synchronized with a smart phone. Thus, if two participants meet, they may quickly share their profile information and create a new connection.

The illustrative embodiments recognize and take into account that a smart badge may be used as a temporary visitor badge. The smart badge may be extended with Near-Field Communication (NFC) capabilities and dynamic behaviors. For example, a smart badge used as a visitor badge may turn red when a visitor has exceeded their visit or entered a restricted area.

The illustrative embodiments recognize and take into account that a smart badge may use Bluetooth® low energy to broadcast within a limited range.

The illustrative embodiments recognize and take into account that such Bluetooth® communication between badges may also scan nearby badges and capture information. In an illustrative embodiment, a smart badge may obtain a smart badge wearer's name and similar interests. Such information may be used to start a conversation between two participants.

The illustrative embodiments recognize and take into account that a smart badge may be compatible with mobile applications on mobile devices such as mobile phones, tablet computers, iPads®, and laptop computers. The illustrative embodiments recognize and take into account that the smart badge may store documents and videos and transfer the documents and videos to a mobile device. The illustrative embodiments recognize and take into account that onboard storage of the smart badge enables data collection and data sharing. Moreover, the onboard storage of the smart badge may transfer or receive documents and videos by a connection to a computer by means of a universal serial bus (USB) port.

Thus, in one illustrative embodiment, one or more technical solutions are present that overcome a technical problem in the area of bringing people attending a conference together that have similar interests or who are working on solving similar problems.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added, in addition to the illustrated blocks, in a flowchart or block diagram.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

In the illustrative examples, the same reference numeral may be used in more than one figure. This reuse of a reference numeral in different figures represents the same element in the different figures.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation with regard to the environments in which the different embodiments may be implemented. Many modifications to the depicted environments may be made.

FIG. 1 depicts a pictorial representation of a network data processing system in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers include client computer 110, client computer 112, and client computer 114. Client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments. The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, a bus with a vehicle computer, and other suitable types of clients.

In the illustrative embodiments, computer-readable program instructions may also be loaded onto a computer, a programmable data processing apparatus, or other device to cause a series of operational steps to be performed on the computer, programmable apparatus or other device to produce a computer implemented process, such that the instructions which execute on the computer, programmable apparatus, or other device implement the functions and/or acts specified in the flowchart and/or block diagram block or blocks.

In the illustrative embodiments, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
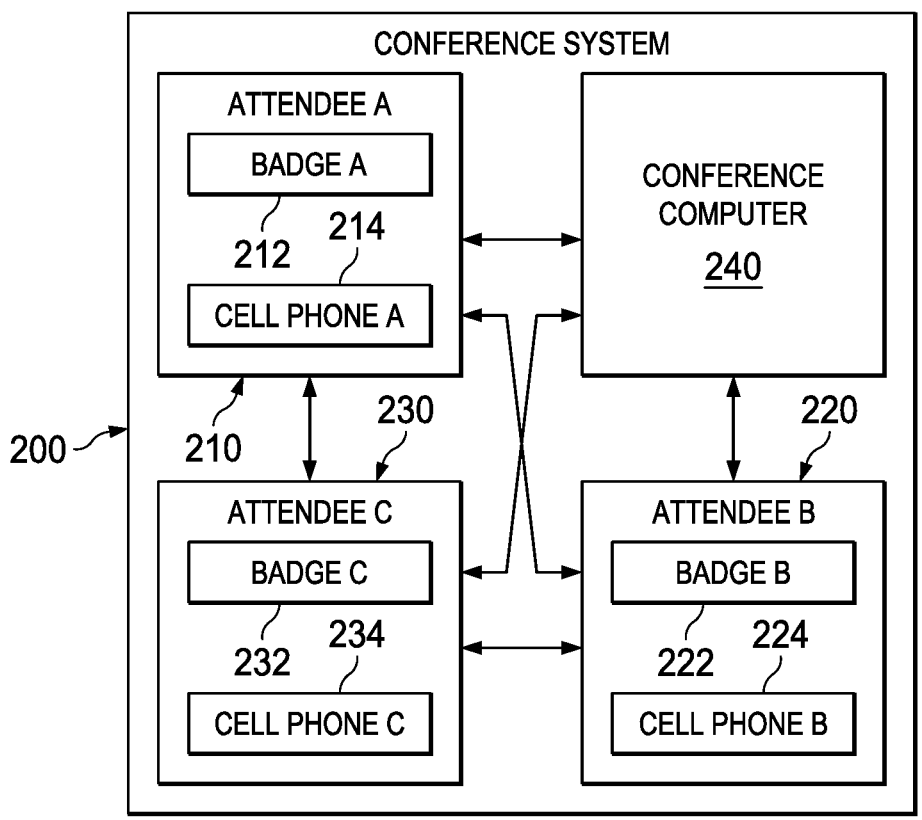
FIG. 2 is a block diagram of a conference system in accordance with an illustrative embodiment.

Turning to FIG. 2, a block diagram of a conference system is depicted in accordance with an illustrative embodiment. Conference system 200 comprises a number of attendees and a conference computer center. The number of attendees may be attendee A 210, attendee B 220 and attendee C 230. The number of attendees is not limited to three as shown. Rather, the three attendees shown in FIG. 2, attendee A 210, attendee B 220, and attendee C 230, are presented as illustrative embodiments of a number of attendees that may be any number of participants in a conference or assembly. Each attendee has a smart badge and may have a cell phone. In FIG. 2, attendee A 210 has badge A 212 and cell phone A 214. Attendee B 220 has badge B 222 and cell phone B 224. Attendee C 230 has badge C 232 and cell phone C 234. As will be discussed further below, the attendees may communicate using the badges as well as their cell phones. A badge, as used herein, is a wearable device that is thin and lightweight enough to be worn on a person's clothing where it will be visible to others in proximity to the wearer and who are looking at the wearer. Conference computer 240 may be in communication with each of the attendees. In FIG. 2, conference computer 240 is shown in two-way communication with attendee A 210, attendee B 220, and attendee C 230. Two-way communication of conference computer 240 may be by communication with a badge such as badge A 212, badge B 222, and badge C 232. In addition, conference computer 240 may download, to each of cell phone A 214, cell phone B 224, and cell phone C 234, an application configured to be activated by a badge such as badge A 212, badge B 222, and badge C 232 in accordance with conditions discussed further below.

Figure 3:
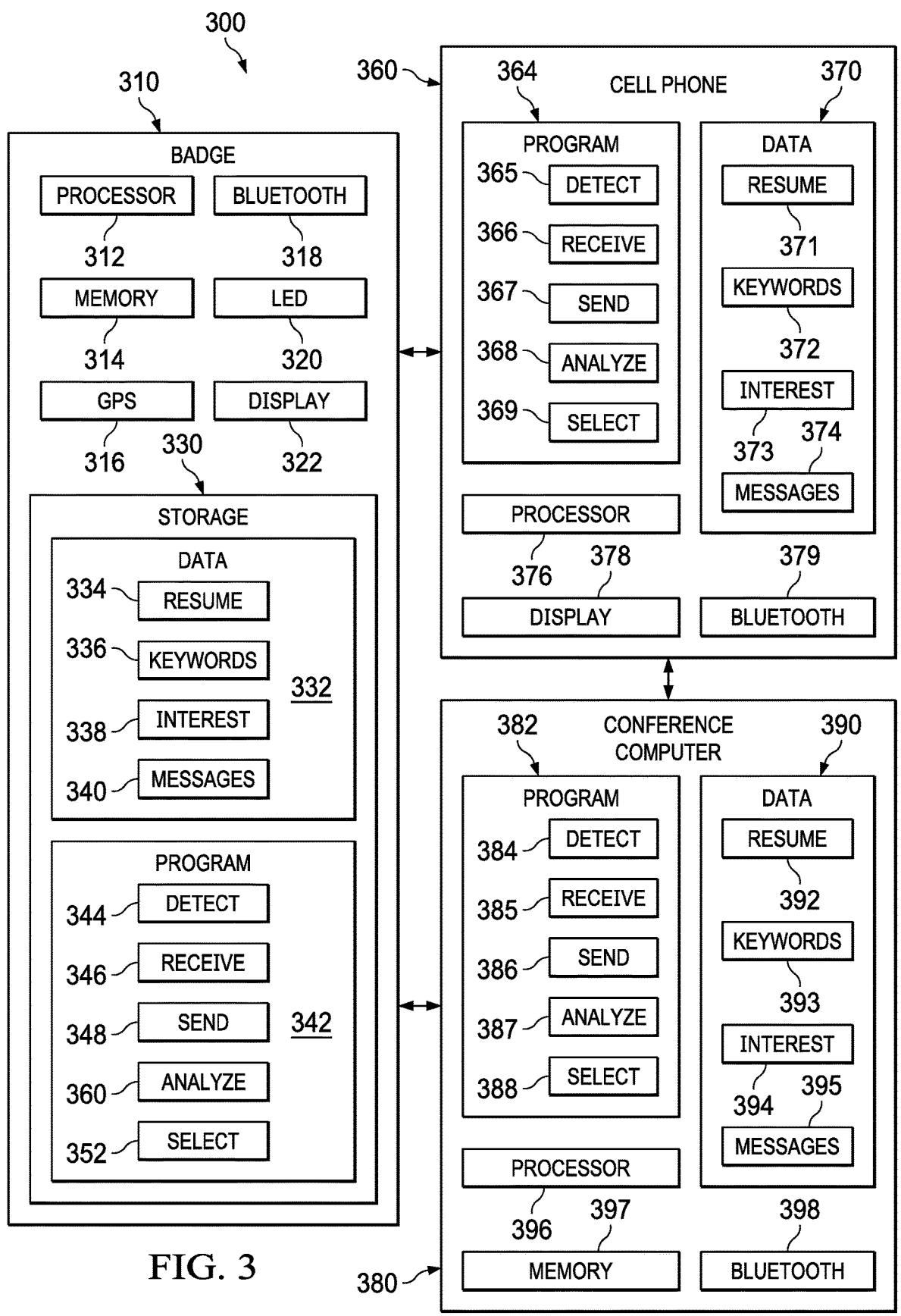
FIG. 3 is a block diagram of conference system components in accordance with an illustrative embodiment.

Turning to FIG. 3, a block diagram of conference system components is depicted in accordance with an illustrative embodiment. Badge 310 represents a wearable badge such as badge A 212, badge B 222, and badge C 232 in FIG. 2. Cell phone 360 represents a cell phone capable of downloading an application from conference computer 380. Cell phone 360 may be one of cell phone A 214, cell phone B 224, and cell phone C 234 in FIG. 2. Conference computer 380 may be part of network 102 in FIG. 1 and include conference computer 240 in FIG. 2. Conference computer 240 may be one of server computer 104, server computer 106, client computer 110, client computer 112, and client computer 114 in FIG. 1.

Badge 310 may have processor 312, memory 314, GPS 316, Bluetooth 318, LED 320, and display 322. Badge 310 may have storage 330. Data 332 and program 342 may be stored in storage 330. Data 332 may comprise resume 334, keywords 336, interest 338, and messages 340. Program 342 may comprise a number of algorithms. The number of algorithms may be detect 344, receive 346, send 348, analyze 350, and select 352. Badge 310 may be configured in accordance with process 400 in FIG. 4. Detect 344 may be configured to detect particular keywords in a received broadcast. Badge 310 may run program 342 in accordance with the processes set forth in FIG. 6 through FIG. 9. Processor 312 may be a processor such as processor unit 1004 in FIG. 10. Memory 314 may be a memory such as memory 1006 in FIG. 10. Bluetooth 318 may be a communications framework such as communications framework 1002 in FIG. 10. Display 322 may be a display such as display 1014 in FIG. 10. Storage 330 may be storage such as persistent storage 1008 in FIG. 10. Data 332 and program 342 may be stored in storage and memory such as persistent storage 1008 and memory 1006 in FIG. 10.

Cell phone 360 may have program 364, data 370, processor 376, display 378, and Bluetooth 379. Program 364 may be a version of program 342 in badge 310 and program 382 in conference computer 380. Program 364 in cell phone 360 may be downloadable by cell phone 360 from conference computer 380. Program 364 has algorithms detect 365, receive 366, send 367, analyze 368, and select 369. Detect 365 may be configured to detect particular keywords in a received broadcast. Receive 366 may receive keywords and messages. Send 367 may send keywords and messages. Analyze 368 may determine whether there is a match of keywords or an interest in a received message. Select 369 may select a particular message to send in response to a determination that a match is present if a keyword or interest has been determined. Algorithms of program 364 may be the same as algorithms of program 342 in badge 310 and program 382 in conference computer 380. Badge 310 may run program 342 in accordance with the processes set forth in FIG. 4 through FIG. 9. Processor 376 may be a processor such as processor unit 1004 in FIG. 10. Bluetooth 379 may be a communications framework such as communications framework 1002 in FIG. 10. Display 378 may be a display such as display 1014 in FIG. 10. Program 364 and data 370 may be stored in storage and memory such as persistent storage 1008 and memory 1006 in FIG. 10.

Conference computer 380 has processor 396, memory 397, Bluetooth 398, program 382, and data 390. Program 382 has algorithms detect 384, receive 385, send 386, analyze 387, and select 388. Detect 384 is configured to detect particular keywords in a received broadcast. Data 390 has resume 392, keywords 393, interest 394, and messages 395. Conference computer 380 may download program 364 to cell phone 360. Conference computer 380 may receive GPS signals from GPS 316 in badge 310. Conference computer 380 may download data from data 390 to one or both of badge 310 and cell phone 360.

Figure 4:
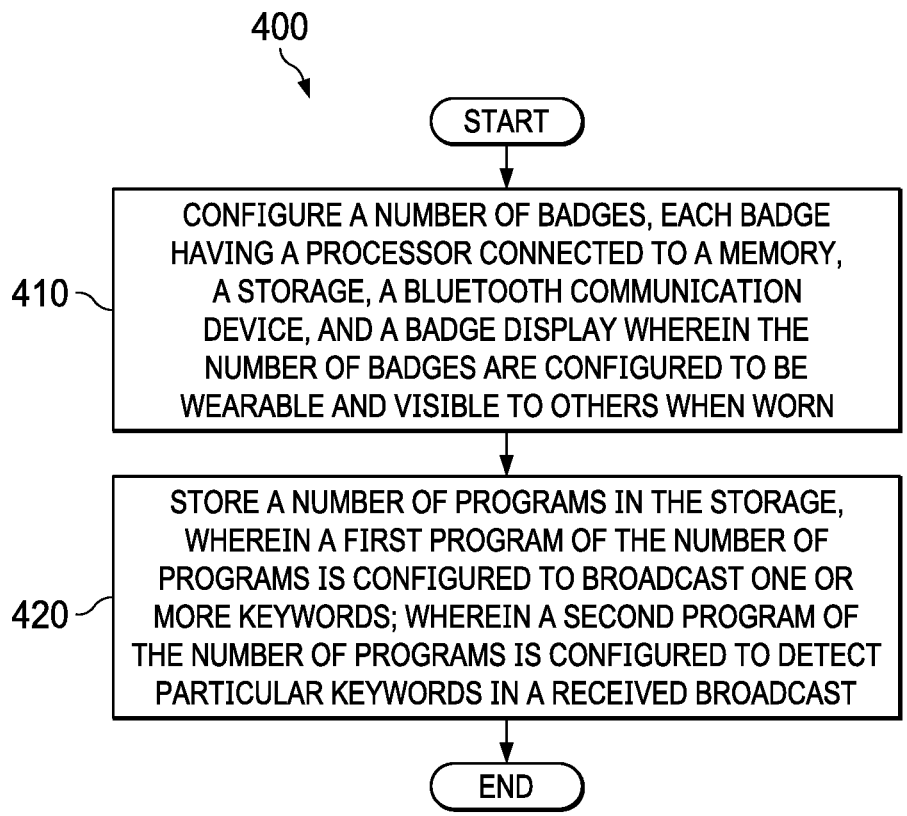
FIG. 4 is a flowchart of a process for configuring a number of badges in accordance with an illustrative embodiment.

Turning to FIG. 4, a flowchart of a process for configuring a number of badges is depicted in accordance with an illustrative embodiment. Process 400 starts. A number of badges are configured, each badge having a processor connected to a memory, a storage, a Bluetooth communications device, and a badge display (step 410). The number of badges may be badge A 212, badge B 222, and badge C 232 in conference system 200 in FIG. 2. The number of badges may be badge 310 in FIG. 3. A number of programs are stored in the storage, wherein a first program of the number of programs is configured to broadcast one or more keywords; wherein a second program of the number of programs is configured to detect particular keywords in a received broadcast; and wherein the number of badges are configured to be wearable and visible to others when worn (step 420). The first program may be send 348 in FIG. 3. The second program may be detect 344 in FIG. 3. Process 400 ends.

Figure 5:
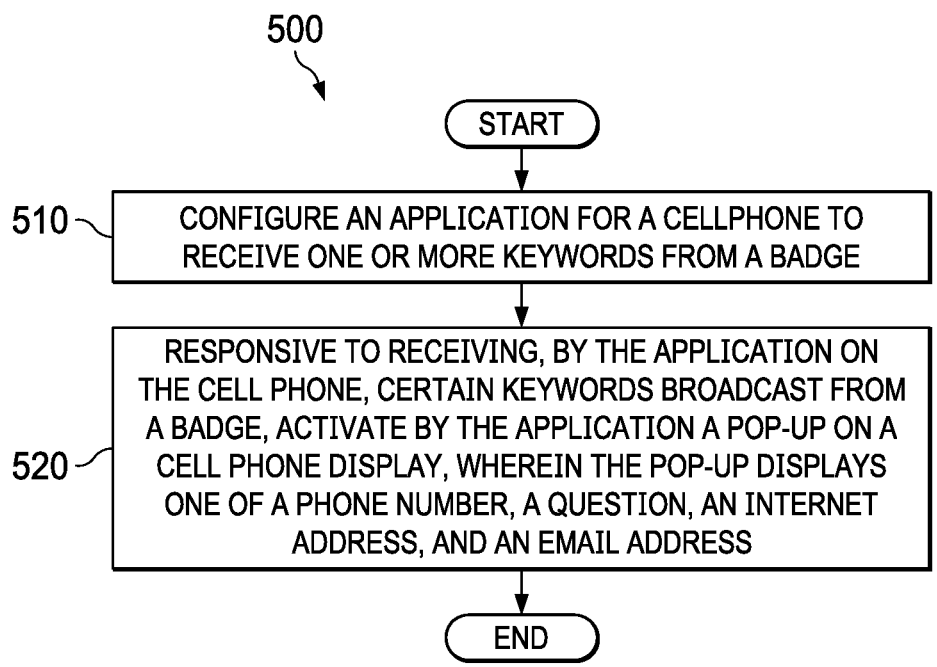
FIG. 5 is a flowchart of a process for configuring a cell phone in accordance with an illustrative embodiment.

Turning to FIG. 5, a flowchart of a process for configuring a cell phone is depicted in accordance with an illustrative embodiment. Process 500 starts. An application for a cellphone is configured to receive one or more keywords from a badge (step 510). The application may be program 364 in cell phone 360 in FIG. 3. Responsive to receiving, by the application on the cell phone, certain keywords broadcast from a badge, the application activates a pop-up on a cell phone display, wherein the pop-up displays one of a phone number, a question, an internet address, and an email address (step 520). The keywords may be keywords 336 from badge 310 in FIG. 3. The pop-up may appear on display 378 of cell phone 360 in FIG. 3. Process 500 ends.

The illustrative embodiments recognize and take into account that the wearable badge may be compatible with mobile applications on mobile devices such as mobile phones, tablet computers, iPads®, and laptop computers. The illustrative embodiments recognize and take into account that the wearable badge may store documents and videos and transfer the documents and videos to a mobile device. The illustrative embodiments recognize and take into account that onboard storage of the wearable badge enables data collection and data sharing. Moreover, the onboard storage of the wearable badge may transfer or receive documents and videos by a connection to a computer by means of a universal serial bus (USB) port.

Figure 6:
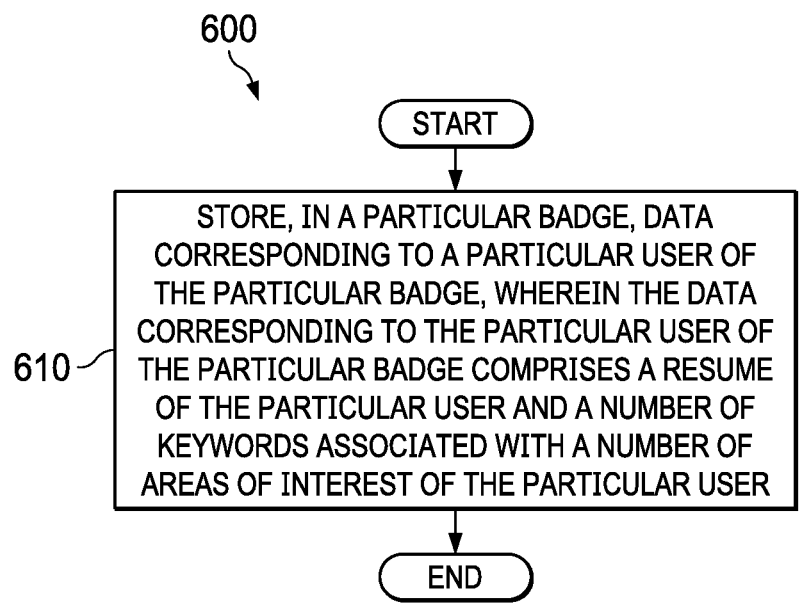
FIG. 6 is a flowchart of a process for configuring a particular badge in accordance with an illustrative embodiment.

Turning to FIG. 6, a flowchart of a process for configuring a particular badge is depicted in accordance with an illustrative embodiment. Process 600 starts. In a particular badge, data corresponding to a particular user of the particular badge is stored, wherein the data corresponding to the particular user of the particular badge comprises a resume of the particular user and a number of keywords associated with a number of areas of interest of the particular user (step 610). The data corresponding to the particular user may be data 332 in badge 310 in FIG. 3. Data 332 may include resume 334, keywords 336, interest 338, and messages 340. Process 600 ends.

Figure 7:
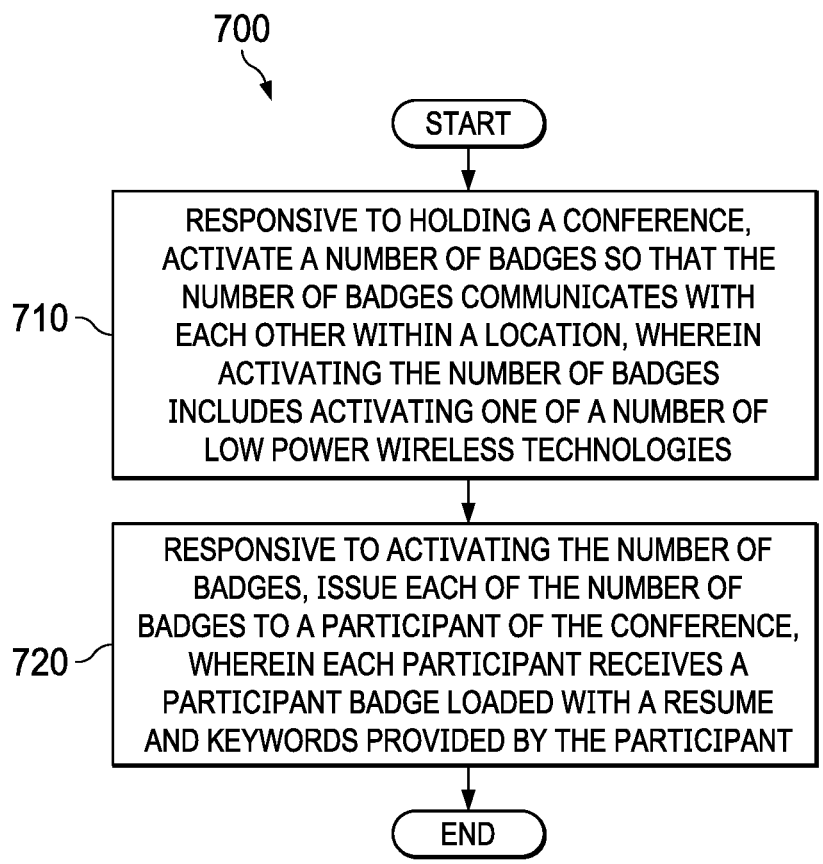
FIG. 7 is a flowchart of a process for using a number of badges at a conference in accordance with an illustrative embodiment.

Turning to FIG. 7, a flowchart of a process for using a number of badges at a conference is depicted in accordance with an illustrative embodiment. Process 700 starts. Responsive to holding a conference, a number of badges are activated so that the number of badges communicates with each other within a location, wherein activating the number of badges includes activating one of a number of low power wireless technologies (step 710). Responsive to activating the number of badges, each of the number of badges is issued to a participant of the conference, wherein each participant receives a participant badge loaded with a resume and keywords provided by the participant (step 720). Process 700 ends.

Figure 8:
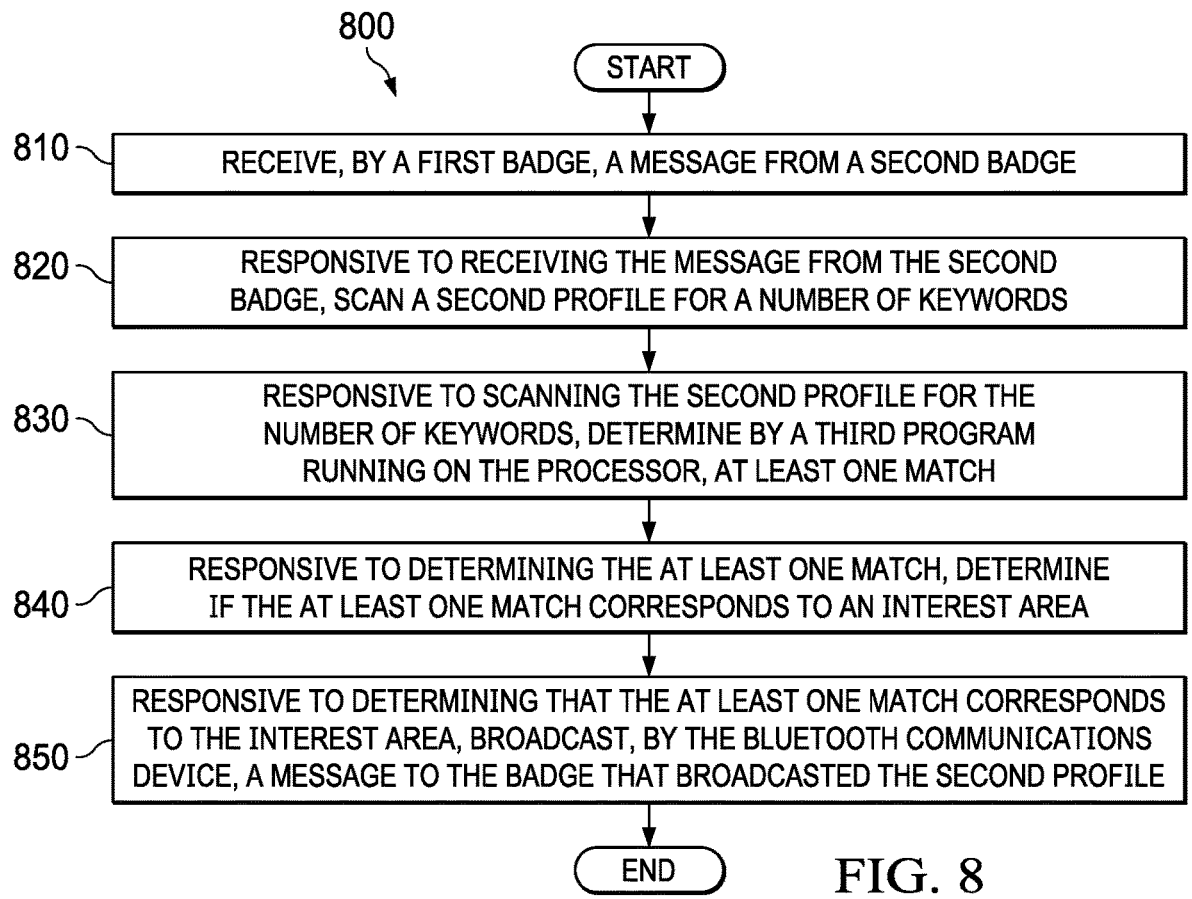
FIG. 8 is a flowchart of a process for communicating between badges at a conference in accordance with an illustrative embodiment.

Turning to FIG. 8, a flowchart of a process for communicating between badges at a conference is depicted in accordance with an illustrative embodiment. Process 800 starts. A first badge receives a message from a second badge (step 810). The message may be a message from messages 340 in badge 310 in FIG. 3. Responsive to receiving the message from the second badge, a second profile is scanned for a number of keywords (step 820). The message may be scanned by receive 346 in FIG. 3. Responsive to scanning the second profile for the number of keywords, a third program running on the processor determines at least one match (step 830). The third program may be analyze 350 in FIG. 3. Responsive to determining the at least one match, a determination is made whether the at least one match corresponds to an interest area (step 840). Responsive to determining that the at least one match corresponds to the interest area, the Bluetooth communications device broadcasts a message to the badge that broadcast the second profile (step 850). The message may be selected by select 352 and broadcast by send 348 in FIG. 3. Process 800 ends.

The illustrative embodiments recognize and take into account that two individuals, each wearing an electronic badge using Bluetooth low energy to broadcast within a limited range, may pass within the limited range of each other. The badges may broadcast an interest of each of the individuals, and when the interest is the same, each receiving badge may determine that a like interest has been detected. When a like interest is detected, each individual's badge may flash and display a message. In an embodiment, the flash may be a light emitting diode (LED) light, and the messages may be the name and interest of the other badge wearer. In an illustrative embodiment, the badges may synchronize and reveal each wearer's name and interest.

Therefore, as used herein, "profile" includes information such as a badge wearer's name and similar interests. Interests may be indicated by keywords. When a determination is made that at least one match corresponds to an interest area, a message may be broadcast as in step 850. As used herein, "message" may include a flashing light on a badge as well text in a display.

Figure 9:
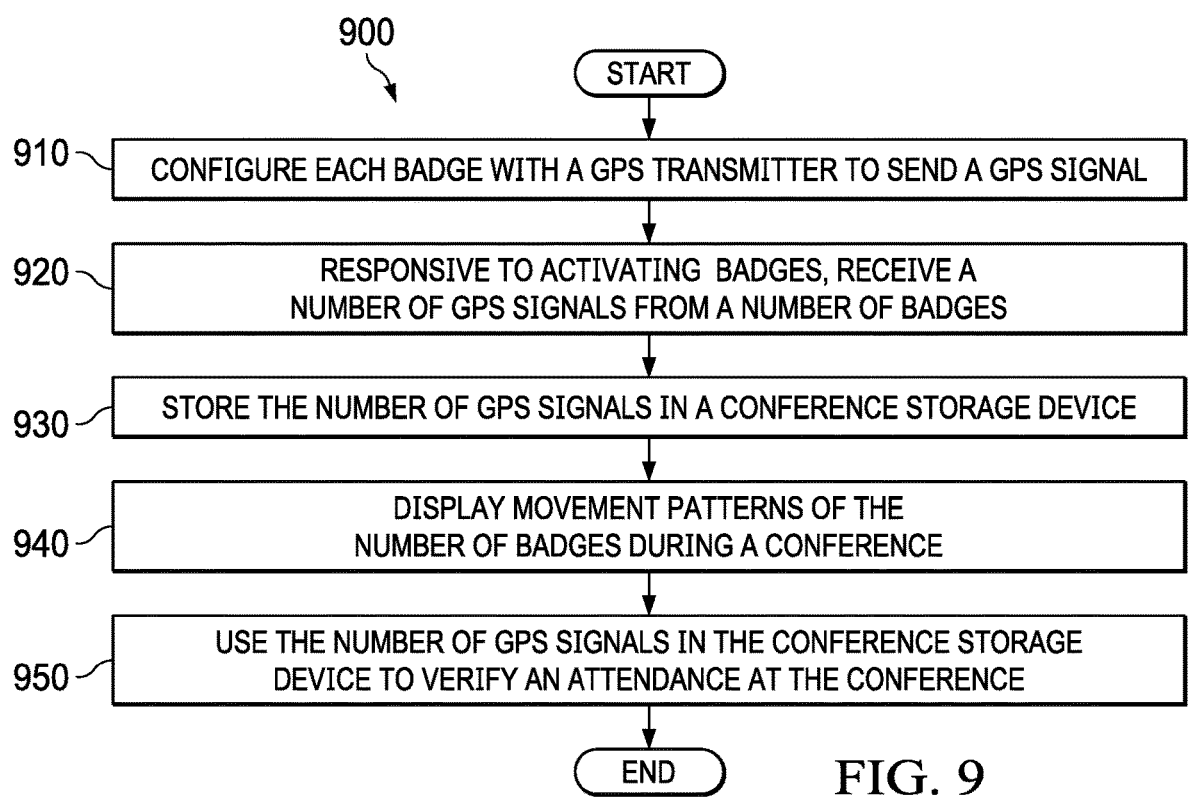
FIG. 9 is a flowchart of a process for using a number of badges at a conference in accordance with an illustrative embodiment.

Turning to FIG. 9, a flowchart of a process for using a number of badges at a conference is depicted in accordance with an illustrative embodiment. Process 900 starts. Each badge is configured with a GPS transmitter to send a GPS signal (step 910). The GPS transmitter may be GPS 316 in FIG. 3. Responsive to activating badges, a number of GPS signals are received from a number of badges (step 920). The number of GPS signals are stored in a conference storage device (step 930). Movement patterns of the number of badges are displayed during a conference (step 940). The number of GPS signals in the conference storage device is used to verify an attendance at the conference (step 950). Process 900 ends.

Figure 10:
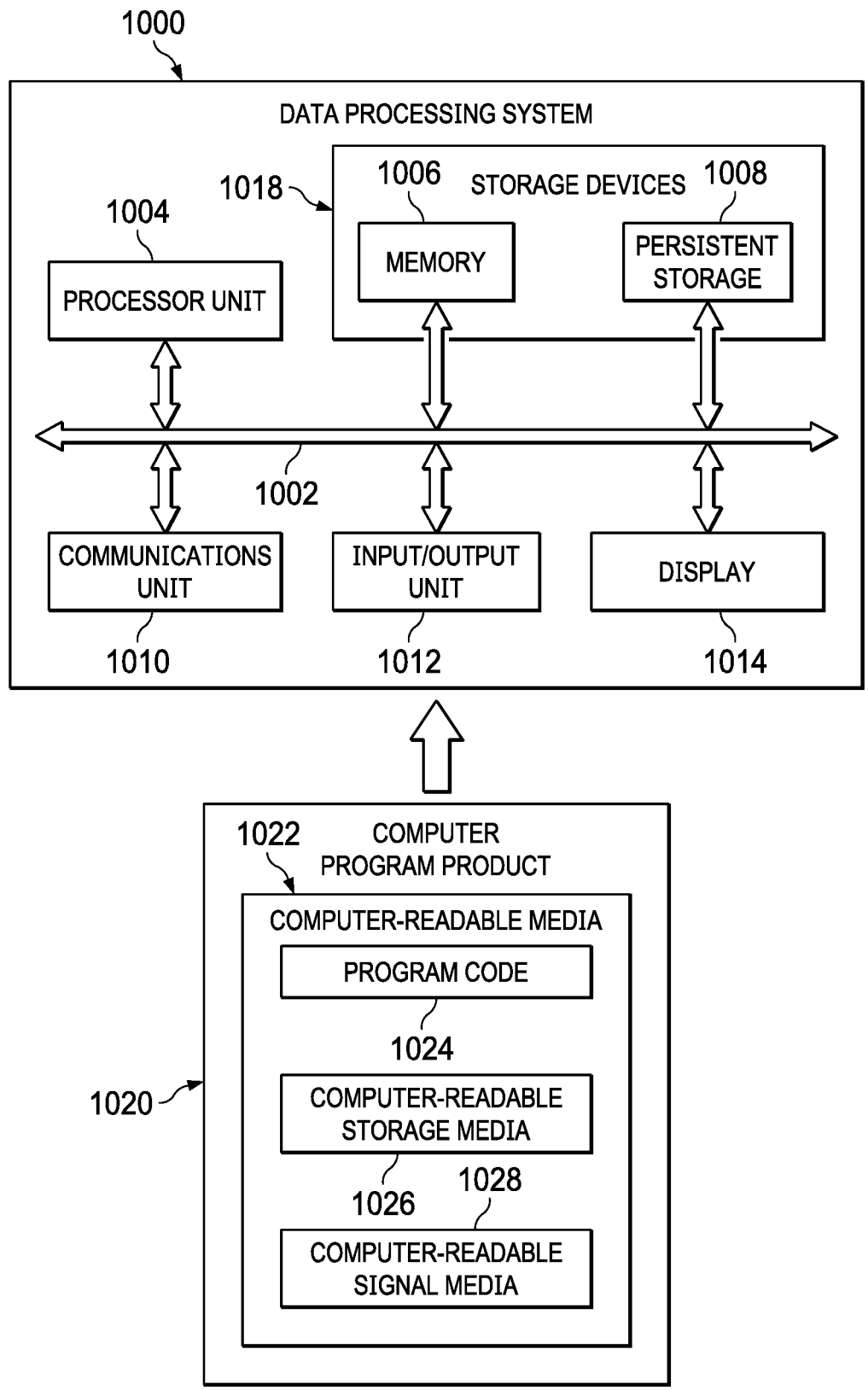
FIG. 10 is a block diagram of a data processing system depicted in accordance with an illustrative embodiment.

Turning now to FIG. 10, an illustration of a block diagram of a data processing system is depicted in accordance with an illustrative embodiment. Data processing system 1000 may be used to implement one or more computers and network data processing system 100 in FIG. 1. In this illustrative example, data processing system 1000 includes communications framework 1002, which provides communications between processor unit 1004, memory 1006, persistent storage 1008, communications unit 1010, input/output unit 1012, and display 1014. In this example, communications framework 1002 may take the form of a bus system.

Processor unit 1004 serves to execute instructions for software that may be loaded into memory 1006. Processor unit 1004 may be a number of processors, a multi-processor core, or some other type of processor, depending on the particular implementation. Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008. Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through at least of a keyboard, a mouse, or some other suitable input device. Further, input/output unit 1012 may send output to a printer. Display 1014 provides a mechanism to display information to a user.

Instructions for at least one of the operating system, applications, or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer-usable program code, or computer-readable program code that may be read and executed by a processor in processor unit 1004. The program code in the different embodiments may be embodied on different physical or computer-readable storage media, such as memory 1006 or persistent storage 1008.

Program code 1024 is located in a functional form on computer-readable media 1022 that is selectively removable and may be loaded onto or transferred to data processing system 1000 for execution by processor unit 1004. Program code 1024 and computer-readable media 1022 form computer program product 1020 in these illustrative examples. In one example, computer-readable media 1022 may be computer-readable storage media 1026 or computer-readable signal media 1028.

In these illustrative examples, computer-readable storage media 1026 is a physical or tangible storage device used to store program code 1024 rather than a medium that propagates or transmits program code 1024. Alternatively, program code 1024 may be transferred to data processing system 1200 using computer-readable signal media 1028.

Computer-readable signal media 1028 may be, for example, a propagated data signal containing program code 1024. For example, computer-readable signal media 1028 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code 1024.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method comprising:
   communicating among conference participants at a conference location by:
      configuring a number of badges, each badge having a processor connected to a memory, a storage, a Bluetooth communications device, a light emitting diode (LED), and a badge display; and
      storing a number of programs in the storage, wherein:
         a first program of the number of programs is configured to broadcast one or more keywords; and
         a second program of the number of programs is configured to detect particular keywords in a received broadcast from a badge in the number of badges worn by a conference participant in the conference participants, wherein the particular keywords indicate an interest of the conference participant;
      wherein:
         the number of badges are configured to be wearable and visible to others when worn; and, in response to detecting the particular keywords in the received broadcast:
            a color of the LED indicates a common interest shared by a number of the conference participants and is the same color as a color of an LED on the badge worn by the conference participant from which the broadcast is received, and
            a name and the interest of the conference participant wearing the badge from which the broadcast is received is displayed on the badge display.

2. The computer-implemented method of claim 1, further comprising:
   configuring an application for a cell phone to receive the one or more keywords in the broadcast from the badge in the number of badges; and
   responsive to receiving, by the application, certain keywords in the received broadcast from the badge, activating by the application a pop-up on a cell phone display; and
   wherein the pop-up displays one of a phone number, a question, an internet address, and an email address.

3. The computer-implemented method of claim 1, further comprising:
   storing, in a particular badge in the number of badges, data corresponding to a particular user of the particular badge; and
   wherein the data corresponding to the particular user of the particular badge comprises a resume of the particular user and a number of keywords associated with a number of areas of interest of the particular user.

4. The computer-implemented method of claim 1, further comprising:
   activating the number of badges so that the number of badges communicate with each other within the conference location; and
   wherein activating the number of badges includes activating one of a number of low power wireless technologies.

5. The computer-implemented method of claim 4, further comprising:
   responsive to activating the number of badges, issuing the number of badges to the conference participants, wherein each conference participant receives a badge in the number of badges that is loaded with a resume and keywords provided by the conference participant.

6. The computer-implemented method of claim 1, further comprising:
   receiving, by a first badge in the number of badges, a first message broadcast from a second badge in the number of badges;
   responsive to receiving the first message from the second badge, scanning the first message for a number of keywords;
   responsive to scanning the first message for the number of keywords, determining by a third program running on the processor of the first badge, at least one match;
   responsive to determining the at least one match, determining if the at least one match corresponds to an interest area; and
   responsive to determining that the at least one match corresponds to the interest area, broadcasting, by the Bluetooth communications device of the first badge, a second message to the second badge that broadcast the first message.

7. The computer-implemented method of claim 6, wherein the second message comprises a name of a participant having the first badge, a statement of the interest area, and a resume of the participant.

8. The computer-implemented method of claim 6, wherein the first badge and the second badge each have a visual cue to help conference participants identify each other; and
   wherein the visual cue is activated in response to receipt of the first message or the second message.

9. The computer-implemented method of claim 2, wherein the pop-up displays a question and a phone number.

10. The computer-implemented method of claim 1, further comprising:
    configuring each badge in the number of badges with a GPS transmitter to send a GPS signal;
    responsive to activating the number of badges, receiving a number of GPS signals from the number of badges;

storing the number of GPS signals in a conference storage device; and
displaying movement patterns of the number of badges.

11. The computer-implemented method of claim 10, further comprising:
using the number of GPS signals in the conference storage device to verify an attendance.

12. A system for communicating among conference participants at a conference location, the system comprising:
a number of badges, each of the number of badges having a processor connected to a memory, a storage, a Bluetooth communications device, a light emitting diode (LED), and a badge display; and
instructions stored on a non-transitory, computer-readable medium, wherein the instructions are executable by the processor, and the instructions include first program code for broadcasting one or more keywords, and detecting particular keywords in a received broadcast from a badge in the number of badges worn by a conference participant in the conference participants, wherein the particular keywords indicate an interest of the conference participant; and
wherein:
the number of badges are configured to be wearable and visible to others when worn; and the instructions are executable by the processor to, in response to detecting the particular keywords in the received broadcast:
control a color of the LED to be the same color as a color of an LED on the badge worn by the conference participant from which the broadcast is received to provide a visual cue indicating a common interest shared by badge wearers, and
display a name and the interest of the conference participant wearing the badge from which the broadcast is received on the badge display.

13. The system of claim 12 further comprising:
a cell phone configured to receive a message from a badge in the number of badges; and
an application stored in the cell phone to identify the one or more keywords in the message;
wherein the application is configured, responsive to identifying the one or more keywords, to activate a pop-up on a cell phone display; and
wherein the pop-up displays one of a phone number, a question, an internet address, and an email address.

14. The system of claim 12, wherein the instructions further comprise:
second program code for receiving by a first badge in the number of badges a first message from a second badge in the number of badges;
third program code for, responsive to receiving the first message from the second badge, scanning the first message for a number of keywords;
fourth program code for, responsive to receiving the first message from the second badge, and responsive to scanning the first message for the number of keywords, determining at least one match;
fifth program code for, responsive to receiving the first message from the second badge, and responsive to determining the at least one match, determining if the at least one match corresponds to an interest area; and
sixth program code for, responsive to determining that the at least one match corresponds to the interest area, broadcasting, by the Bluetooth communications device of the first badge, a second message to the second badge.

15. The system of claim 12, wherein the instructions further comprise:
second program code for storing data corresponding to a user of a badge in a number of badges, wherein the data comprises a resume of a particular user and a number of keywords associated with a number of areas of interest of the particular user.

16. The system of claim 12, further comprising:
each of the number of badges having a GPS transmitter connected to the processor and to the Bluetooth communications device, the GPS transmitter configured to send a GPS signal; and
wherein the instructions further comprise second program code for, responsive to activation of a power supply, sending the GPS signal to a receiving device connected to a conference computer.

17. A computer program product comprising:
a non-transitory, computer-recordable storage medium including instructions, the instructions configured for execution by a processor unit, the instructions comprising:
first program code for receiving by a first badge a first message from a second badge;
second program code for, responsive to receiving the first message from the first badge, scanning the first message for a number of keywords;
third program code for, responsive to receiving the first message from the second badge, and responsive to scanning the first message for the number of keywords, determining at least one match;
fourth program code for, responsive to receiving the first message from the second badge, and responsive to determining the at least one match, determining if the at least one match corresponds to an interest area; and
fifth program code for, responsive to determining that the at least one match corresponds to the interest area:
broadcasting, by a Bluetooth communications device, a second message to the second badge; and
updating a first color of a first light emitting diode (LED) of the first badge to match a second color of a second LED of the second badge, or updating the second color of the second LED to match the first color of the first LED, wherein the first color and the second color comprise visual cues to allow badge wearers to identify each other.

18. The computer program product of claim 17, wherein the instructions further comprise:
sixth program code for storing data corresponding to a user of the first badge, wherein the data comprises a resume of a particular user and a number of keywords associated with a number of areas of interest of the particular user.

19. The computer program product of claim 17, wherein the instructions further comprise:
sixth program code for, responsive to activation of a power supply, sending a position to a receiving device connected to a conference computer.

20. The computer program product of claim 17, wherein the instructions further comprise:
sixth program code for activating a visual cue.

21. The computer-implemented method of claim 6, further comprising:
responsive to determining that the at least one match corresponds to the interest area, updating the color of the LED of the first badge based on the at least one match.

* * * * *